United States Patent
Graf

(10) Patent No.: US 7,808,784 B2
(45) Date of Patent: Oct. 5, 2010

(54) FLANGE FOR SEALING AN OPENING OF A FUEL CONTAINER OF A MOTOR VEHICLE

(75) Inventor: Rolf Graf, Speyer (DE)

(73) Assignee: Continental Automotive GmbH, Hannover (DE)

( * ) Notice: Subject to any disclaimer, the term of this patent is extended or adjusted under 35 U.S.C. 154(b) by 397 days.

(21) Appl. No.: 12/065,944

(22) PCT Filed: Sep. 6, 2006

(86) PCT No.: PCT/EP2006/066081

§ 371 (c)(1),
(2), (4) Date: Mar. 6, 2008

(87) PCT Pub. No.: WO2007/031455

PCT Pub. Date: Mar. 22, 2007

(65) Prior Publication Data

US 2008/0246227 A1    Oct. 9, 2008

(30) Foreign Application Priority Data

Sep. 13, 2005    (DE) ........................ 10 2005 043 818

(51) Int. Cl.
  *H05K 7/20*    (2006.01)
(52) U.S. Cl. ...................... 361/704; 361/699; 361/707; 361/719; 361/714; 165/80.3; 165/104.33
(58) Field of Classification Search ................ None
See application file for complete search history.

(56) References Cited

U.S. PATENT DOCUMENTS

| | | | | |
|---|---|---|---|---|
| 5,454,697 | A | 10/1995 | Nakanishi | 417/423.3 |
| 5,531,111 | A | 7/1996 | Okamoto et al. | 73/149 |
| 6,397,791 | B1 * | 6/2002 | Brister | 123/41.15 |
| 6,716,000 | B2 | 4/2004 | Appleton et al. | 417/360 |
| 6,820,642 | B2 * | 11/2004 | Veinotte et al. | 137/493.9 |
| 6,889,546 | B2 | 5/2005 | Shost et al. | 73/291 |
| 7,263,978 | B2 * | 9/2007 | York et al. | 123/497 |
| 2005/0100461 | A1 | 5/2005 | Izutani et al. | 417/423.8 |
| 2005/0160461 | A1 | 7/2005 | Baumgartner et al. | 725/52 |
| 2007/0129902 | A1 * | 6/2007 | Orbell | 702/55 |
| 2007/0284006 | A1 * | 12/2007 | Suzuki et al. | 137/565.01 |

FOREIGN PATENT DOCUMENTS

| | | |
|---|---|---|
| DE | 39 03 558 A1 | 8/1990 |
| DE | 195 15 776 A1 | 11/1995 |
| DE | 10 2004 048 965 A1 | 6/2005 |
| EP | 1 403 119 A2 | 8/2003 |
| EP | 1 169 566 B1 | 1/2004 |
| JP | 2001-99029 | 4/2001 |

* cited by examiner

*Primary Examiner*—Boris L Chervinsky
(74) *Attorney, Agent, or Firm*—King & Spalding L.L.P.

(57) ABSTRACT

A flange (3) for sealing an opening (1) of a fuel container (2) of a motor vehicle maintains an electronic component (9) which is arranged on the external side (5) on a carrier (12). The carrier (12) is embodied as a single piece and has a heat-conducting element (13) which can penetrate the wall (4) of a flange (3). The heat-conducting element (13) dissipates the heat which is produced by the electronic component (9) to the inside (7) of the fuel container (2).

18 Claims, 2 Drawing Sheets

FLANGE FOR SEALING AN OPENING OF A FUEL CONTAINER OF A MOTOR VEHICLE

CROSS-REFERENCE TO RELATED APPLICATION

This application is a U.S. national stage application of International Application No. PCT/EP2006/066081 filed Sep. 6, 2006, which designates the United States of America, and claims priority to German Application number 10 2005 043 818.0 filed Sep. 13, 2005, the contents of which are hereby incorporated by reference in their entirety.

TECHNICAL FIELD

The invention relates to a flange for sealing an opening of a fuel tank of a motor vehicle, with a wall, with an external side of the wall, which side is to be arranged for arrangement on the external side of the fuel tank, and with an internal side of the wall, which side faces the interior of the fuel tank in the designated installation position.

BACKGROUND

Flanges of this type are frequently used for closing and sealing openings, which are generally designed as installation openings, in fuel tanks of motor vehicles nowadays and are known from practice. Further components which have electric or hydraulic leadthroughs are also frequently arranged on or in the wall. If said components produce a power loss, the heat is to be removed. In order to remove the heat, cooling elements which are fastened on the components which output the power loss have been known in practice. The cooling elements output the heat of the components into the surroundings of the fuel tank. A disadvantage of the known flange is that the cooling elements are highly cost-intensive and, in addition, project away from the flange in a very bulky manner.

The exits a need for a flange of the type mentioned at the beginning designed in such a manner that undesirable heat is particularly reliably dissipated and that it can be produced particularly cost-effectively.

SUMMARY

According to an embodiment, a flange for sealing an opening of a fuel tank of a motor vehicle may comprise a wall having an external side to be arranged on an external side of the fuel tank, and an internal side of the wall facing the interior of the fuel tank in the designated installation position, wherein at least one electronic component is arranged in a region separated from the fuel, and wherein at least one heat-conducting element is guided as far as the internal side.

According to a further embodiment, the heat-conducting element and a leadthrough of an electric contact through the wall may be designed as different components. According to a further embodiment, the heat-conducting element may protrude over the internal side. According to a further embodiment, the heat-conducting element may project freely from the internal side into the fuel tank. According to a further embodiment, a housing which engages over the heat-conducting element may be arranged on the internal side, and the housing may have a connection for a fuel line. According to a further embodiment, the housing can be designed as a guide for fuel flowing against it and has an opening pointing into the fuel tank. According to a further embodiment, the housing may be sealed in relation to the flange, and a further connection may be arranged on the external side of the flange and is connected to the housing. According to a further embodiment, the electronic component may be arranged on a printed circuit board, and the heat-conducting element may be formed integrally with a carrier of the printed circuit board. According to a further embodiment, a protective housing which covers the electronic component may be arranged on the external side opposite the housing arranged on the internal side, or the electronic component may be covered by a casting compound. According to a further embodiment, the wall may be manufactured from plastic and the heat-conducting element may be manufactured from metal. According to a further embodiment, the heat-conducting element may protrude away from the internal side in a stirrup-shaped manner and may be fixed at its free end in the plastic of the wall.

BRIEF DESCRIPTION OF THE DRAWINGS

The invention permits numerous embodiments. To further clarify its basic principle, two of these are illustrated in the drawing and are described below. In the drawing

DETAILED DESCRIPTION

Figure 1:
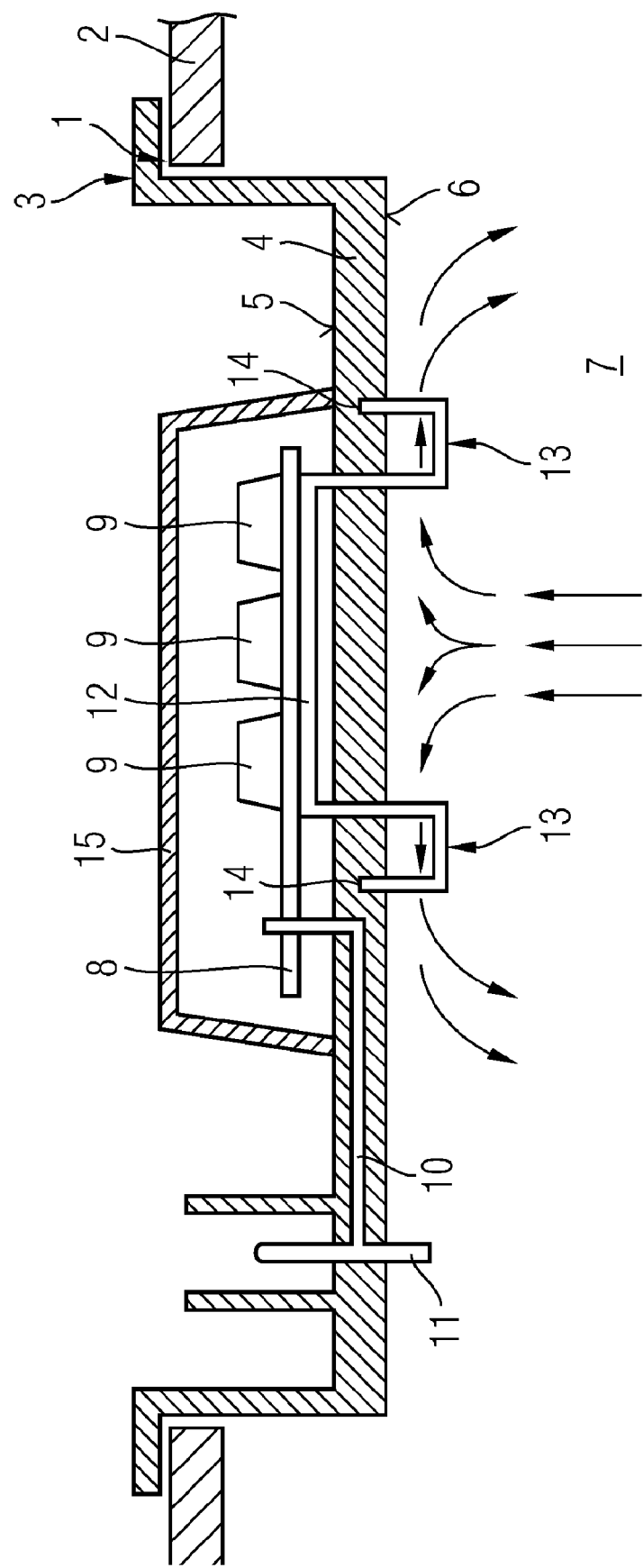
FIG. 1 shows a sectional illustration through a first embodiment of the flange.

According to various embodiments, at least one electronic component is arranged in a region separated from the fuel and in at least one heat-conducting element is guided as far as the internal side.

This design makes it possible for the heat produced by the electronic component to be removed to the fuel in the fuel tank in a particularly simple manner. Since there are in any case sloshing movements of the fuel and air movements within the fuel tank, the heat can be removed by the heat-conducting element in a particularly simple manner. The reliable output of heat into the fuel tank means that the use of a large and bulky cooling body is not required. The flange according to an embodiment therefore permits the particularly reliable dissipation of undesirable heat and, in addition, can be produced particularly cost-effectively. The region which is separated from the fuel and has the electronic component may be preferably the external side of the flange.

The heat-conducting element could be formed, for example, integrally with a leadthrough, which is present in any case, of an electric line. However, heat can be removed in a simple manner from components to be insulated in relation to the leadthrough, according to a further embodiment, if the heat-conducting element and a leadthrough of an electric contact through the wall are designed as different components.

The heat-conducting element could be fastened, for example, in a flat manner on the internal side. However, the transfer of heat to the fuel located in the fuel tank is improved, according to another embodiment, if the heat-conducting element protrudes over the internal side.

A cooling of the heat-conducting element takes place in a simple manner by means of natural convection and by means of sloshing movements of the fuel within the fuel tank if the heat-conducting element projects freely from the internal side into the fuel tank. By this means, the flange according to an embodiment is constructed in a particularly simple manner and can be manufactured cost-effectively. The heat output can be improved, for example, by directing a free jet, which is produced by a suction jet pump arranged in the fuel tank, at the heat-conducting element.

According to another embodiment, the transfer of heat from the heat-conducting element to the fuel is further improved if a housing which engages over the heat-conducting element is arranged on the internal side and if the housing has a connection for a fuel line. A delivery line of a suction jet pump can be connected to the connection and, for example, delivers fuel from one chamber of the fuel tank to another chamber.

According to another embodiment, the housing is designed as a guide for fuel flowing against it and has an opening pointing into the fuel tank.

According to another embodiment, the electronic component can be cooled by a forward flow line guided to an internal combustion engine of the motor vehicle if the housing is sealed in relation to the flange and if a further connection is arranged on the external side of the flange and is connected to the housing. By means of this design, the forward flow line is guided through the housing. The electronic component is therefore continuously cooled during the operation of the internal combustion engine and therefore also of the motor vehicle.

The flange according to an embodiment has a particularly low number of components if the electronic component is arranged on a printed circuit board and if the heat-conducting element is formed integrally with a carrier of the printed circuit board.

The electronic component can be reliably protected against external influences, according to another embodiment, if a protective housing which covers the electronic component is arranged on the external side opposite the housing arranged on the internal side, or if the electronic component is covered by a casting compound.

The flange according to an embodiment can be manufactured particularly cost-effectively if the wall is manufactured from plastic and the heat-conducting element is manufactured from metal. The sealing of such a heat-conducting element in relation to the plastic is known in general from leadthroughs of electric lines.

According to another embodiment, the heat-conducting element permits a particularly high heat output with a particularly high mechanical stability if the heat-conducting element protrudes away from the internal side in a stirrup-shaped manner and is fixed at its free end in the plastic of the wall.

FIG. 1 shows a flange 3 which is inserted into an opening 1 of a fuel tank 2 and has a plastic wall 4 which closes the opening 1. The wall 4 of the flange 3 has an external side 5 provided for installation on the external side of the fuel tank 2, and an internal side 6. The internal side 6 faces the interior 7 of the fuel tank 2. A printed circuit board 8 with a plurality of electronic components 9 is fastened on the external side 5 of the flange 3. The printed circuit board 8 is connected via a line 10, which is guided in the wall 4, to a contact 11 penetrating the wall 4. In the fitted state of the fuel tank 2, a component, such as, for example, a fuel pump, which is arranged within the fuel tank 2 is supplied with electric current via the contact 11. Furthermore, the contact 11 supplies the printed circuit board 8 having the electronic components 9 with electric current. The printed circuit board 8 is fastened on a carrier 12. The carrier 12 is manufactured integrally with a heat-conducting element 13. The ends 14 thereof are guided through the wall 4 of the flange 3 and project into the interior 7 of the fuel tank 2 in a stirrup-shaped manner. The free ends 14 of the heat-conducting element 13 are cast in the wall 4. The printed circuit board 8 having the electronic components 9 is arranged under a protective housing 15 connected to the wall 4. As an alternative to the arrangement of the electronic components 9 under the protective housing 15, the electronic components 9 may also be covered by a casting compound. Heat produced by the electronic components 9 is conducted via the heat-conducting element 13 into the interior 7 of the fuel tank 2. Sloshing movements of fuel or a fuel flow produced, for example, by a suction jet pump and indicated in the drawing by arrows dissipates the heat from the heat-conducting element 13. This prevents the electronic components 9 or components adjacent thereto from overheating.

Figure 2:
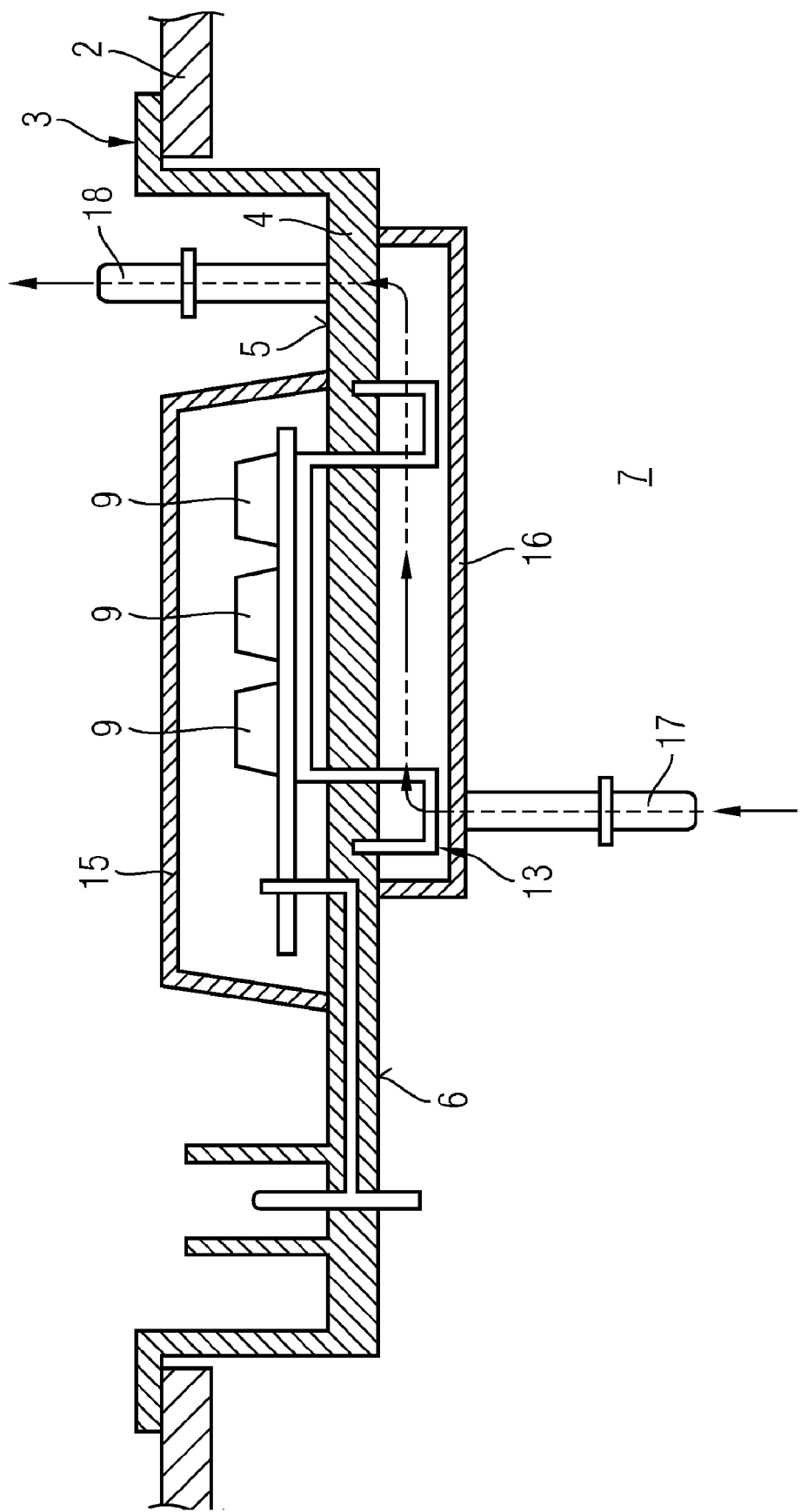
FIG. 2 shows a further embodiment of the flange in a sectional illustration.

FIG. 2 shows a further embodiment of the flange 3 which differs from the embodiment from FIG. 1 only in that those regions of the heat-conducting element 13 which protrude away from the internal side 6 are arranged below a housing 16. A connection 17 for a fuel line is arranged on the housing 16 while a connection 18 for a fuel line (not illustrated) which leads on further is likewise arranged on the external side 5 of the wall 4. Connections 17, 18 of this type serve in the case of flanges 3 nowadays for the passage of a forward flow or return line via which an internal combustion engine is supplied with fuel. During a flow from the one connection 17 to the other connection 18, fuel flows through the housing 16 which is arranged on the internal side 6 of the wall 4. In this case, those regions of the heat-conducting element 13 which project into the housing 16 have fuel washing around them. The heat produced by the electronic components 9 is therefore transferred to the flowing fuel.

In one embodiment (not illustrated), the housing 16 is designed as a guide for fuel flowing against it and has an opening which opens into the fuel tank 2. In this case, the housing 16, as described with regard to FIG. 2, can have the connection 17 for a fuel line.

What is claimed is:

1. A flange for sealing an opening of a fuel tank of a motor vehicle, the fuel tank containing fuel, the flange comprising a wall having an external side to be arranged on an external side of the fuel tank, and an internal side of the wall facing an interior of the fuel tank in the designated installation position, wherein at least one electronic component is arranged in a region separated from the fuel, and wherein at least one heat-conducting element extends from the at least one electronic component to the interior of the fuel tank.

2. The flange according to claim 1, wherein the heat-conducting element and an electric contact extending through the wall are designed as different components.

3. The flange according to claim 1, wherein the heat-conducting element protrudes over the internal side.

4. The flange according to claim 1, wherein a housing which engages over the heat-conducting element is arranged on the internal side and wherein the housing has a connection for a fuel line.

5. The flange according to claim 4, wherein the housing is designed as a guide for fuel flowing against it and has an opening pointing into the fuel tank.

6. The flange according to claim 4, wherein the housing is sealed in relation to the flange, and wherein a further connection is arranged on the external side of the flange and is connected to the housing.

7. The flange according to claim 1, wherein the electronic component is arranged on a printed circuit board, and wherein the heat-conducting element is formed integrally with a carrier of the printed circuit board.

8. The flange according to claim 4, wherein a protective housing which covers the electronic component is arranged on the external side opposite the housing arranged on the internal side, or wherein the electronic component is covered by a casting compound.

9. The flange according to claim 1, wherein the wall is manufactured from plastic and the heat-conducting element is manufactured from metal.

10. The flange according to claim 1, wherein the heat-conducting element protrudes away from the internal side in a stirrup-shaped manner and is fixed at its free end in the plastic of the wall.

11. A method for sealing an opening of a fuel tank of a motor vehicle, the fuel tank containing fuel, the method comprising the steps of:

arranging a wall having an external side on an external side of the fuel tank, arranging an internal side of the wall facing an interior of the fuel tank in the designated installation position, arranging at least one electronic component in a region separated from the fuel, and arranging at least one heat-conducting element to extend from the at least one electronic component to the interior of the fuel tank.

12. The method according to claim 11, wherein the heat-conducting element and an electric contact extending through the wall are designed as different components.

13. The method according to claim 11, wherein the heat-conducting element protrudes over the internal side.

14. The method according to claim 11, further comprising the step of arranging a housing which engages over the heat-conducting element on the internal side, and wherein the housing has a connection for a fuel line.

15. The method according to claim 14, wherein the housing is designed as a guide for fuel flowing against it and has an opening pointing into the fuel tank.

16. The method according to claim 14, wherein the housing is sealed in relation to the flange, and wherein a further connection is arranged on the external side of the flange and is connected to the housing.

17. The method according to claim 11, wherein the electronic component is arranged on a printed circuit board, and wherein the heat-conducting element is formed integrally with a carrier of the printed circuit board.

18. The method according to claim 14, wherein a protective housing which covers the electronic component is arranged on the external side opposite the housing arranged on the internal side, or wherein the electronic component is covered by a casting compound.

* * * * *